(12) United States Patent
Fujii

(10) Patent No.: US 8,102,433 B2
(45) Date of Patent: Jan. 24, 2012

(54) DISPLAYING AVAILABILITY OF AUTO-FOCUS AREAS IN AN IMAGE-CAPTURING APPARATUS

(75) Inventor: Shinichi Fujii, Osaka (JP)

(73) Assignee: Sony Corporation, Tokyo (JP)

( * ) Notice: Subject to any disclaimer, the term of this patent is extended or adjusted under 35 U.S.C. 154(b) by 451 days.

(21) Appl. No.: 12/276,716

(22) Filed: Nov. 24, 2008

(65) Prior Publication Data

US 2009/0147123 A1 Jun. 11, 2009

(30) Foreign Application Priority Data

Dec. 10, 2007 (JP) ................. 2007-318173

(51) Int. Cl.
*H04N 5/225* (2006.01)

(52) U.S. Cl. .................. 348/217.1; 348/222.1; 348/234; 348/333.02; 348/371

(58) Field of Classification Search ........ 348/222.1, 348/333.01, 333.02, 333.03, 333.11, 345, 348/217.1, 234, 371
See application file for complete search history.

(56) References Cited

U.S. PATENT DOCUMENTS

| | | | | |
|---|---|---|---|---|
| 7,893,598 B2* | 2/2011 | Kawai et al. | ............. | 310/323.02 |
| 2002/0149689 A1* | 10/2002 | Sannoh et al. | ........... | 348/333.02 |
| 2006/0127080 A1 | 6/2006 | Mori et al. | | |
| 2008/0166116 A1* | 7/2008 | Tsuchiya | ........................ | 396/89 |
| 2008/0193115 A1* | 8/2008 | Uenishi | ........................ | 348/349 |
| 2010/0272424 A1* | 10/2010 | Ishii | ............................ | 396/104 |

FOREIGN PATENT DOCUMENTS

| | | |
|---|---|---|
| EP | 0 981 245 A2 | 2/2000 |
| EP | 0 981 245 A3 | 2/2000 |
| EP | 1 250 002 A1 | 10/2002 |
| JP | 2003-259163 | 9/2003 |
| JP | 2006-251065 | 9/2006 |
| JP | 2007-240566 | 9/2007 |

\* cited by examiner

*Primary Examiner* — Gevell Selby
(74) *Attorney, Agent, or Firm* — Oblon, Spivak, McClelland, Maier & Neustadt, L.L.P.

(57) ABSTRACT

An image-capturing apparatus includes an image-capturing element configured to receive object light and generate image signals representing an object image; a display unit; a phase-difference detector configured to receive the object light using a range-finding sensor and generate a phase-difference detection signal; a first focus detection unit configured to perform focus detection on the basis of the phase-difference detection signal; a display control unit configured to display a preview image before actual image capturing on the display unit on the basis of the image signals that are sequentially generated by the image-capturing element; and a setting unit configured to set whether or not an area display mode in which an area in which focus detection is possible on an image-capturing plane is combined with the preview image and displayed on the display unit should be enabled.

11 Claims, 12 Drawing Sheets

DISPLAYING AVAILABILITY OF AUTO-FOCUS AREAS IN AN IMAGE-CAPTURING APPARATUS

CROSS REFERENCES TO RELATED APPLICATIONS

The present invention contains subject matter related to Japanese Patent Application JP 2007-318173 filed in the Japanese Patent Office on Dec. 10, 2007, the entire contents of which are incorporated herein by reference.

BACKGROUND OF THE INVENTION

1. Field of the Invention

The present invention relates to an image-capturing apparatus having an electronic finder function.

2. Description of the Related Art

In single-lens reflex digital cameras, confirmation of an object is usually performed using an optical finder. There has been proposed an image-capturing apparatus having an electronic finder function for displaying an object on a monitor in a movie-like manner (see Japanese Unexamined Patent Application Publication No. 2006-251065).

In Japanese Unexamined Patent Application Publication No. 2006-251065, there has been proposed a technology for performing auto-focus (AF) control in a contrast detection method, which is performed when the camera is in a mirror-up state, in a case where a composition determination operation is to be performed by using an electronic finder (in an electronic finder mode) and for performing AF control in a phase-difference detection method, which is performed when the camera is in a mirror-down state, in a case where a composition determination operation is to be performed by using an optical finder (in an optical finder mode).

Here, in AF control in a phase-difference detection method, which is performed when a camera is in a mirror-down state, usually, a phase-difference AF module having a photometering sensor such as a line sensor is used. In the phase-difference AF module, in principle, it is difficult to allocate many AF areas (also referred to as "module AF areas"). In comparison, in AF control in a contrast detection method, many AF areas can be designated within an image-capturing plane.

SUMMARY OF THE INVENTION

For this reason, in the technology disclosed in Japanese Unexamined Patent Application Publication No. 2006-251065, if the finder mode is changed to an optical finder mode after an object area used for focusing is determined in a composition determination operation in an electronic finder mode, there is a possibility that a module AF area does not exist at the position of the object area. In such a case, it is necessary for a user to adjust the angle of view. The operation becomes complex, and the convenience regarding focusing decreases.

Accordingly, it is desirable to provide an image-capturing apparatus capable of improving convenience regarding focusing.

According to an embodiment of the present invention, there is provided an image-capturing apparatus including: an image-capturing element configured to receive object light and generate image signals representing an object image; a display unit; a phase-difference detector configured to receive the object light using a range-finding sensor and generate a phase-difference detection signal; first focus detection means for performing focus detection on the basis of the phase-difference detection signal; display control means for displaying a preview image before actual image capturing on the display unit on the basis of the image signals that are sequentially generated by the image-capturing element; and setting means for setting whether or not an area display mode in which an area in which focus detection is possible on an image-capturing plane is combined with the preview image and displayed on the display unit should be enabled, wherein, when the area display mode has been enabled, the display control means allows a first area in which focus detection is performed using the range-finding sensor to be displayed on the display unit, and when the area display mode has not been enabled, the display control means does not allow the first area to be displayed on the display unit.

According to another embodiment of the present invention, there is provided an image-capturing apparatus including: an image-capturing element configured to receive object light and generate image signals representing an object image; a display unit; a mirror unit configured to, as a result of being arranged in a light path of the object light, change the light path of the object light; a phase-difference detector configured to receive the object light whose light path has been changed by the mirror unit using a range-finding sensor and generate a phase-difference detection signal; focus detection means for performing focus detection on the basis of the phase-difference detection signal; mirror control means for retracting the mirror unit from the light path; display control means for displaying a preview image before actual image capturing on the display unit on the basis of the image signals that are sequentially generated by the image-capturing element in a state in which the mirror unit has been retracted from the light path; and setting means for setting whether or not an area display mode in which an area in which focus detection is possible on an image-capturing plane is combined with the preview image and displayed on the display unit should be enabled, wherein, when the area display mode has been enabled, the display control means allows the area in which focus detection is performed using the range-finding sensor to be displayed on the display unit when preview image is to be displayed, and when the area display mode has not been enabled, the display control means does not allow the first area to be displayed on the display unit.

According to another embodiment of the present invention, there is provided an image-capturing apparatus including: an image-capturing element configured to receive object light and generate image signals representing an object image; a display unit; a phase-difference detector configured to receive the object light using a range-finding sensor and generate a phase-difference detection signal; first focus detection means for performing focus detection on the basis of the phase-difference detection signal; and display control means for displaying a preview image before actual image capturing on the display unit on the basis of the image signals that are sequentially generated by the image-capturing element, wherein the display control means includes display pattern switching means for selectively switching between a first display pattern with which a first focus detection area in which focus detection is performed using the range-finding sensor on an image-capturing plane is displayed on the display unit and a non-display pattern with which a focus detection area is not displayed on the display unit.

According to the embodiments of the present invention, since the presence or absence of a display on the display unit in the first area can be changed depending on whether or not the area display mode should be enabled, it is possible to improve convenience regarding focusing.

DESCRIPTION OF THE PREFERRED EMBODIMENTS

First Embodiment

Exterior Configuration of Image-Capturing Apparatus 1A

Figure 1:
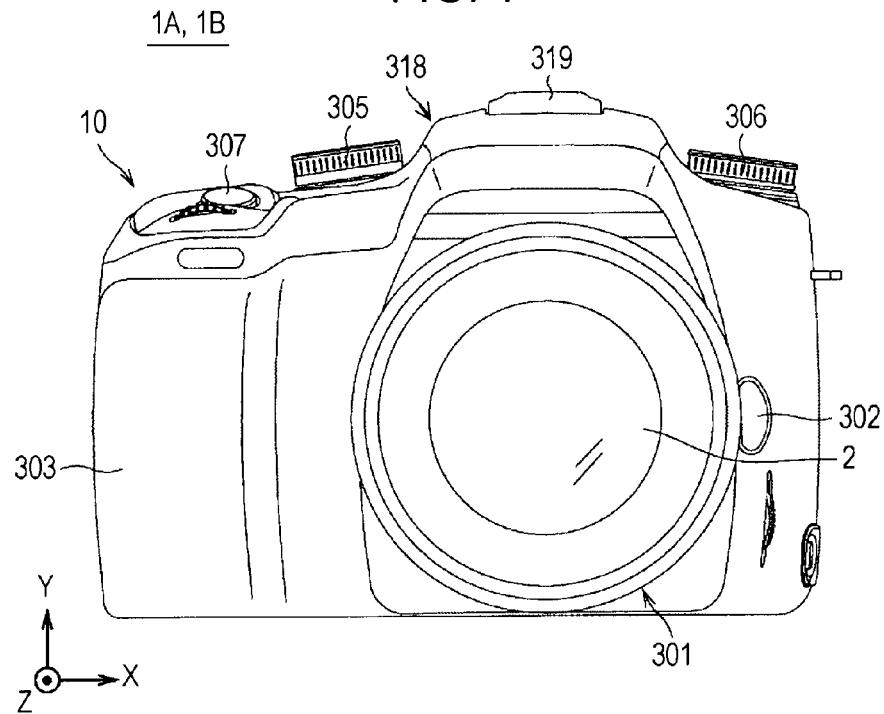
FIG. 1 shows the exterior configuration of an image-capturing apparatus according to a first embodiment of the present invention.
Figure 2:
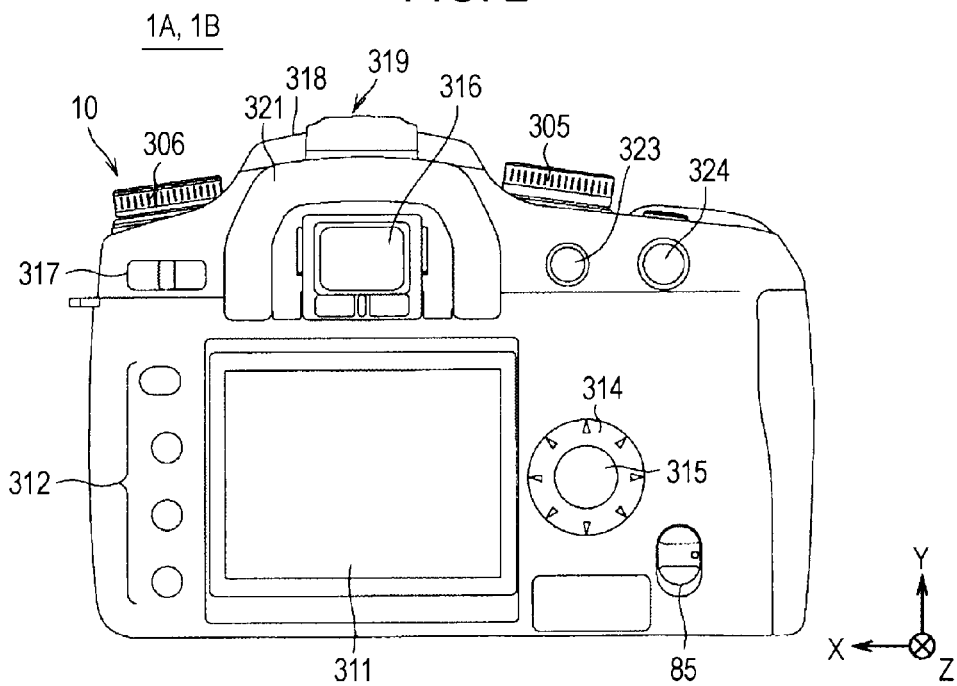
FIG. 2 shows the exterior configuration of the image-capturing apparatus according to the first embodiment of the present invention.

FIGS. 1 and 2 show the exterior configuration of an image-capturing apparatus 1A according to a first embodiment of the present invention. Here, FIGS. 1 and 2 show a front view and a back view, respectively.

The image-capturing apparatus 1A is configured as, for example, a single-lens reflex digital still camera, and includes a camera body 10, and an interchangeable lens 2 serving as an image-capturing lens that can be attached to and detached from the camera body 10.

More specifically, as shown in FIG. 1, provided on the front side of the camera body 10 are a mount unit 301 in which the interchangeable lens 2 is mounted in substantially the center of the front; a lens release button 302 arranged to the right of the mount unit 301; a grip unit 303 with which gripping is possible; a mode setting dial 305 arranged in the upper left area of the front; a control value setting dial 306 arranged in the upper right area of the front; and a shutter button 307 arranged on the top surface of the grip unit 303.

The interchangeable lens 2 functions as a lens window for receiving light (object light) from an object and also functions as an image-capturing optical system for guiding object light to an image-capturing element 101 arranged inside the camera body 10.

Figure 5:
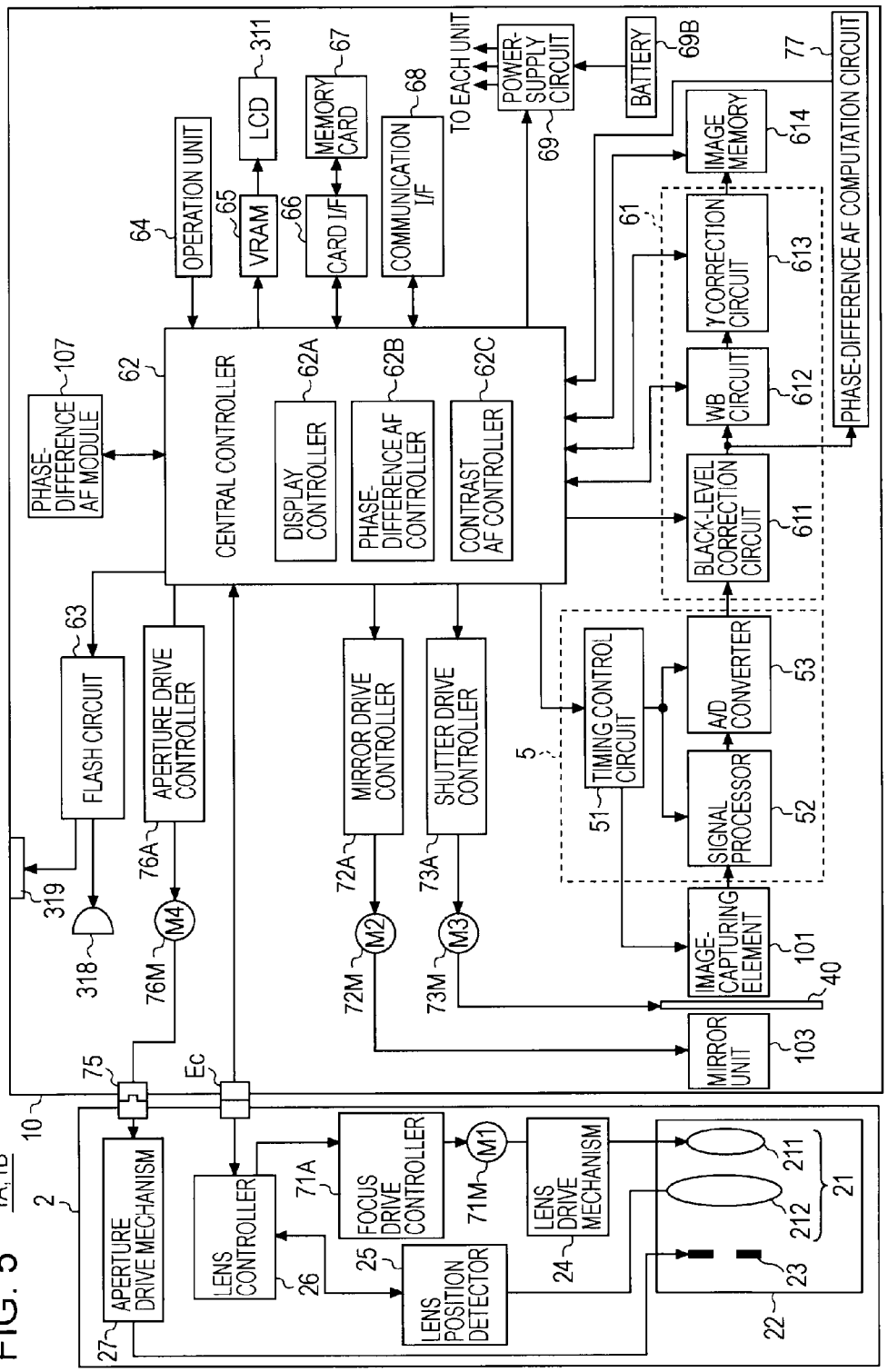
FIG. 5 is a block diagram showing the electrical configuration of the image-capturing apparatus.

In more detail, the interchangeable lens 2 includes a lens group 21 formed of a plurality of lenses arranged in a serial manner along an optical axis LT (see FIG. 5). The lens group 21 includes a focus lens 211 (FIG. 5) for adjusting focus and a zoom lens 212 (FIG. 5) for performing variable power. As a result of the lenses being driven in the direction of the optical axis LT (see FIG. 3), focus adjustment and variable power are performed, respectively. The interchangeable lens 2 is provided with an operation ring that is rotatable along the outer peripheral surface of a lens barrel at an appropriate outer peripheral place. The zoom lens 212 is moved in an optical-axis direction in accordance with the rotational direction and the number of revolutions of the operation ring by manual operation or by automatic operation so that the zoom lens 212 is set at a zoom magnification (image-capturing magnification) corresponding to the position of a movement destination.

The mount unit 301 is provided with a connector Ec (see FIG. 5) for making electrical connection with the mounted interchangeable lens 2 and a coupler 75 (FIG. 5) for making mechanical connection.

The lens exchange button 302 is a button that is pressed when the interchangeable lens 2 mounted in the mount unit 301 is to be demounted.

The grip unit 303 is a part at which the image-capturing apparatus 1A is gripped by an image-capturing person (user) during image capturing. The grip unit 303 is provided with surface grooves that fit the finger shape for added comfort. A battery compartment and a card compartment (not shown) are provided inside the grip unit 303. The battery compartment is housed with a battery 69B (see FIG. 5) as a power supply for the image-capturing apparatus 1A, and the card compartment is housed with a memory card 67 (FIG. 5) for recording image data of captured images in such a manner that the memory card 67 can be attached thereto and detached therefrom. The grip unit 303 may be provided with a grip sensor for detecting whether the user has gripped the grip unit 303.

The mode setting dial 305 and the control value setting dial 306 are made of members that are substantially disc shaped and that are rotatable within the plane approximately parallel to the top surface of the camera body 10. The mode setting dial 305 is used to select various kinds of modes (various kinds of image-capturing modes (a portrait image-capturing mode, a landscape image-capturing mode, a full auto image-capturing mode, etc.) installed in the image-capturing apparatus 1A, a reproduction mode in which a captured image is reproduced, a communication mode in which data communication is performed with external devices, etc.). On the other hand, the control value setting dial 306 is used to set control values for various kinds of functions installed in the image-capturing apparatus 1A.

The shutter button 307 is a press switch capable of detecting a "half-pressed state" in which the shutter button 307 is pushed in halfway and a "fully pressed state" in which the shutter button 307 is pushed in further. When the shutter button 307 is half-pressed (S1) in the image-capturing mode, preparatory operations (preparatory operations, such as setting of an exposure control value and focus detection) for capturing a still image of an object are performed. When the shutter button 307 is fully pressed (S2), image capturing operations (a series of operations for exposing the image-capturing element 101 (see FIG. 3), performing predetermined image processing on an image signal obtained by the exposure, and recording the image signal in a memory card or the like) are performed.

As shown in FIG. 2, provided on the back side of the camera body 10 are a liquid-crystal display (LCD) 311 functioning as a display unit; a finder window 316 disposed above the LCD 311; an eyecup 321 that surrounds the finder window 316; a main switch 317 disposed to the left of the finder window 316; an exposure correction button 323 and an AE lock button 324, which are disposed to the right of the finder window 316; a flash unit 318 disposed above the finder window 316; and a connection terminal unit 319 disposed above the finder window 316. Provided on the back side of the camera body 10 are a setting button group 312 arranged to the left of the LCD 311; a direction selection key 314 arranged to the right of the LCD 311; a push button 315 arranged in the center of the direction selection key 314; and a display selector switch 85 arranged to the lower right of the direction selection key 314.

The LCD 311 includes a color liquid-crystal panel capable of performing image display, so that an image captured using the image-capturing element 101 (see FIG. 3) is displayed or a recorded image is reproduced and displayed and also, a screen for setting functions and modes installed in the image-capturing apparatus 1A is displayed. In place of the LCD 311, an organic EL display device or a plasma display device may be used.

The finder window (eyepiece window) 316 forms an optical finder (OVF), and light (object light) that forms an object image, which has been transmitted through the interchangeable lens 2, is guided to the finder window 316. By viewing the finder window 316, it is possible for the user to visually recognize an object image captured in practice by the image-capturing element 101.

The main switch 317 is formed of a two-contact slide switch that slides side by side. When the main switch 317 is set to the left, the power supply of the image-capturing apparatus 1A is switched on, and when the main switch 317 is set to the right, the power supply is switched off.

The flash unit 318 is configured as a pop-up built-in flash. On the other hand, in a case where an external flash or the like is to be mounted in the camera body 10, connection is made using the connection terminal unit 319.

The eyecup 321 is a light-shielding member, which suppresses intrusion of extraneous light to the finder window 316.

The exposure correction button 323 is a button for manually adjusting exposure values (an aperture value and a shutter speed). The AE lock button 324 is a button for fixing exposure.

The setting button group 312 includes buttons for performing operations for various kinds of functions installed in the image-capturing apparatus 1A. Examples of the setting button group 312 include a menu button for displaying the menu screen on the LCD 311 and a menu switching button for switching between content displayed on the menu screen.

The direction selection key 314 has an annular member including a plurality of press units (triangular marks in the figure) arranged at fixed intervals in the circumferential direction, so that a pressing operation of a press unit is detected using a contact (switch) (not shown) provided in such a manner as to correspond to each press unit. The push button 315 is arranged in the center of the direction selection key 314. The direction selection key 314 and the push button 315 are used to input instructions for changing image-capturing magnification (the movement of the zoom lens 212 (see FIG. 5) in the wide direction or in the tele direction), for advancing the frame of a recording image to be reproduced on the LCD 311 or the like, and for setting image capturing conditions (an aperture value, a shutter speed, presence or absence of flash light emission, and the like).

The display selector switch 85 is formed of a two-point slide switch. When the contact is set at an "optical" position in the upper area, an optical finder mode (also referred to as an "OVF mode") is selected, and an object image is displayed within the field of view of the optical finder. As a result, it is possible for the user to perform a composition determination operation (framing) by visually recognizing an object image displayed within the field of view of the optical finder via the finder window 316.

On the other hand, when the contact of the display selector switch 85 is set at a "monitor" position in the lower area, an electronic finder mode (also referred to as an "EVF mode" or a "live-view mode") is selected, and a live-view image related to the object image is displayed on the LCD 311 in a movie-like mode. As a result, it is possible for the user to perform framing by visually recognizing a live-view image displayed on the LCD 311.

As described above, it is possible for the user to switch the finder mode by operating the display selector switch 85. In the image-capturing apparatus 1A, it is possible to perform the composition determination of an object by using an electronic finder in which a live-view display is performed or by using an optical finder.

Internal Configuration of Image-Capturing Apparatus 1A

Figure 3:
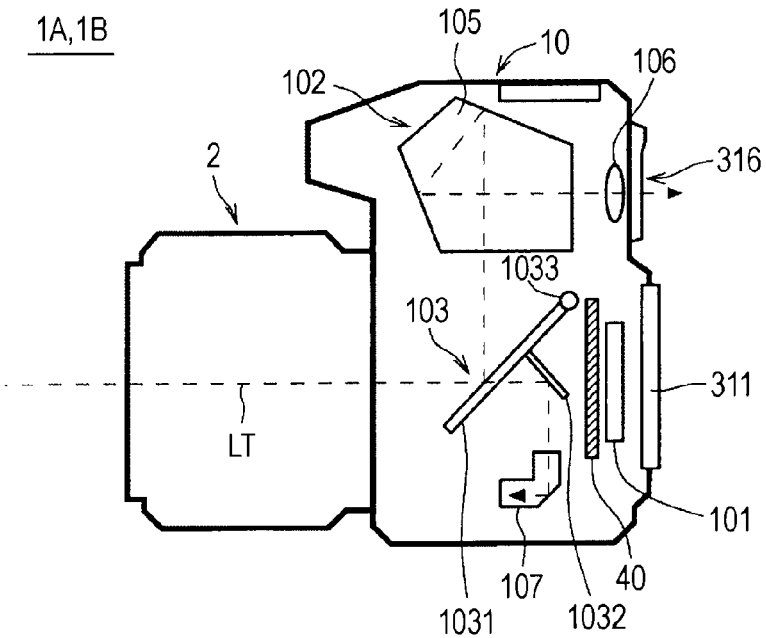
FIG. 3 is a longitudinal sectional view of the image-capturing apparatus.
Figure 4:
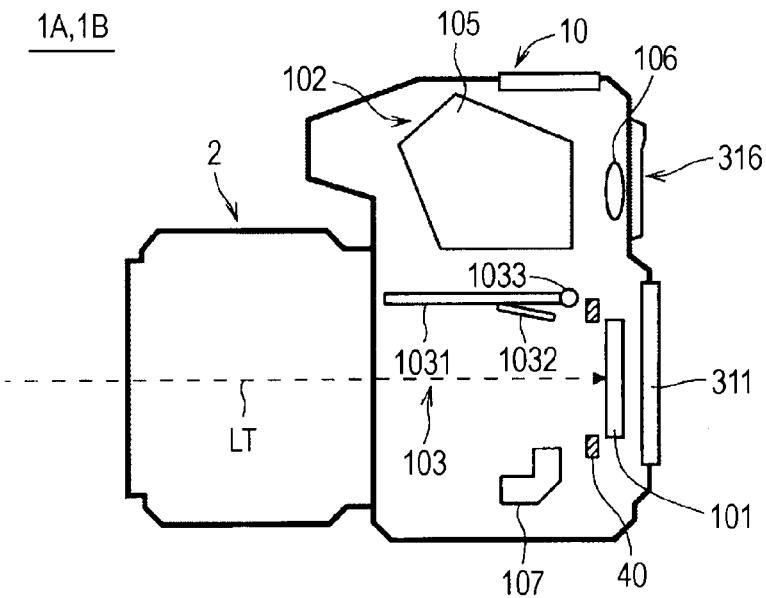
FIG. 4 is a longitudinal sectional view of the image-capturing apparatus.

Next, the internal configuration of the image-capturing apparatus 1A will be described. FIGS. 3 and 4 are longitudinal sectional views of the image-capturing apparatus 1A. As shown in FIG. 3, an image-capturing element 101, a finder unit 102 (finder optical system), a mirror unit 103, a phase-difference AF module (also referred to simply as an "AF module") 107, and the like are provided inside the camera body 10.

The image-capturing element 101 is arranged perpendicularly to the optical axis LT along the optical axis LT of the lens group 21 provided in the interchangeable lens 2 in a case where the interchangeable lens 2 is mounted in the camera body 10. For the image-capturing element 101, for example, a CMOS color-area sensor (CMOS image-capturing element) in which a plurality of pixels each having a photodiode are arranged in matrix in a two dimensional manner is used. The image-capturing element 101 generates an analog electrical signal (image signal) of components of each color of R (red), G (green), and B (blue), which are related to an object image that is formed as an image after passing through the interchangeable lens 2, and outputs an image signal of each color of R, G, and B.

Furthermore, the image-capturing element 101 has light-receiving elements for detecting a phase difference on the image-capturing plane, the details of which will be described later.

In the optical axis LT, the mirror unit 103 is arranged at a position at which object light is reflected toward the finder unit 102. The object light that has been transmitted through the interchangeable lens 2 is reflected upward by the mirror unit 103 (a main mirror 1031 (to be described later)) and also, some of the object light is transmitted through the mirror unit 103.

The finder unit 102 includes a pentaprism 105, an eyepiece lens 106, and a finder window 316. The pentaprism 105 is a prism that has a pentagonal shape in cross section, by which the top and bottom and the left and right of an object image formed by light entering the lower surface of the prism are flipped by the reflection in the inside and formed as an erect image. The eyepiece lens 106 guides the light of the object image formed as an erect image by the pentaprism 105 to the outside of the finder window 316. With such a configuration, the finder unit 102 functions as an optical finder for confirming an object field at image-capturing waiting time before actual image capturing.

The mirror unit 103 includes the main mirror 1031 and a sub-mirror 1032. On the back side of the main mirror 1031, the sub-mirror 1032 is rotatably provided in such a manner as to fall toward the back side of the main mirror 1031. Some of the object light that has been transmitted through the main mirror 1031 is reflected by the sub-mirror 1032, and the reflected object light enters the AF module 107.

The mirror unit 103 is configured as a so-called quick return mirror. For example, during exposure time (during actual image capturing) (see FIG. 4), the mirror unit 103 jumps upward by using a rotational axis 1033 as a fulcrum and reaches a retracted state (mirror-up state) from the light path of the object light. At this time, when the mirror unit 103 is stopped at a position below the pentaprism 105, the sub-mirror 1032 becomes folded so as to be substantially parallel to the main mirror 1031. As a result, the object light from the interchangeable lens 2 reaches the image-capturing element 101 without being shielded by the mirror unit 103, and the image-capturing element 101 is exposed. When the image-capturing operation in the image-capturing element 101 is completed, the mirror unit 103 returns to the original position (the position shown in FIG. 3) and reaches a mirror-down state.

Furthermore, by causing the mirror unit 103 to reach a mirror-up state before actual image capturing (image capturing for image recording purpose), it becomes possible for the image-capturing apparatus 1A to perform a live-view (preview) display in which an object is displayed on the LCD 311 in a movie-like mode on the basis of image signals generated in sequence by the image-capturing element 101.

The AF module 107 is configured as a so-called AF sensor formed of a range-finding element (also referred to as a "range-finding sensor") for detecting focusing information of an object. The AF module 107 is disposed in the bottom part of the mirror unit 103 and has a phase-difference detection function of generating a phase-difference detection signal corresponding to the degree of focusing of an object image. That is, in a case where the object is to be confirmed by the user by using the finder window 316 during image-capturing waiting time, as shown in FIG. 3, the object light is guided to the AF module 107 in a state in which the main mirror 1031 and the sub-mirror 1032 are tilted down and also, a phase-difference detection signal is output from the AF module 107.

On the front side in the optical-axis direction of the image-capturing element 101, a shutter unit 40 is arranged. The shutter unit 40 includes a curtain that moves in the up-and-down direction, and is configured as a mechanical focal plane shutter for performing a light-path opening operation and a light-path shielding operation for object light that is guided to the image-capturing element 101 along the optical axis LT. The shutter unit 40 can be omitted in a case where the image-capturing element 101 is a completely electronic shutter capable image-capturing element.

Electrical Configuration of Image-Capturing Apparatus 1A

FIG. 5 is a block diagram showing the electrical configuration of the image-capturing apparatus 1A. Here, members identical to those in FIGS. 1 to 4 are designated with the same reference numerals. For the sake of description, the electrical configuration of the interchangeable lens 2 will be described.

The interchangeable lens 2 includes, in addition to the lens group 21 constituting the above-described image-capturing optical system, a lens drive mechanism 24, a lens position detector 25, a lens controller 26, and an aperture drive mechanism 27.

In the lens group 21, the focus lens 211, the zoom lens 212, and the aperture 23 for adjusting the amount of light that enters the image-capturing element 101 are held in the direction of the optical axis LT (FIG. 3) within the lens barrel. Object light received by the lens group 21 is formed as an image in the image-capturing element 101. In automatic focusing (AF) control, focus adjustment is performed by the focus lens 211 being driven in the direction of the optical axis LT by an AF actuator 71M inside the interchangeable lens 2.

On the basis of the AF control signal supplied from the central controller 62 via the lens controller 26, the focus drive controller 71A generates a driving control signal necessary to move the focus lens 211 to the focus position, and controls the AF actuator 71M by using the driving control signal. The AF actuator 71M is formed of a stepping motor and the like, and supplies a lens driving force to the lens drive mechanism 24.

The lens drive mechanism 24 is formed of, for example, a helicoid and gears (not shown) with which the helicoid is rotated. By receiving a driving force from the AF actuator 71M, the lens drive mechanism 24 causes the focus lens 211 and the like to be driven in a direction parallel to the optical axis LT. The movement direction and the amount of movement of the focus lens 211 accord with the rotational direction and the number of revolutions of the AF actuator 71M, respectively.

The lens position detector 25 includes an encoding plate on which a plurality of code patterns are formed at predetermined pitches in the direction of the optical axis LT within the range of the movement of the lens group 21, and an encoder brush that moves integrally with a lens while slidably contacting the encoding plate, and detects the amount of movement when the focus of the lens group 21 is to be adjusted. The lens position detected by the lens position detector 24 is output as, for example, the number of pulses.

The lens controller 26 is constituted by a microcomputer in which, for example, a ROM storing control programs or a memory such as a flash memory storing data on status information is incorporated.

The lens controller 26 has a communication function of performing communication with the central controller 62 of the camera body 10 via the connector Ec. As a result, for example, status information data, such as the focus distance, the aperture value, the in-focus distance, or the peripheral light amount status of the lens group 21, and the position information on the focus lens 211, which is detected by the lens position detector 25, can be transmitted to the central controller 62. Also, for example, data on the amount of driving of the focus lens 211 can be received from the central controller 62.

Upon receiving the driving force from the aperture driving actuator 76M via the coupler 75, the aperture drive mechanism 27 changes the aperture diameter of the aperture 23.

Next, the electrical configuration of the camera body 10 will be described. The camera body 10 includes, in addition to the above-described image-capturing element 101, the shutter unit 40 and the like, an analog front end (AFE) 5, an image processor 61, an image memory 614, a central controller 62, a flash circuit 63, an operation unit 64, a VPAM 65, a card I/F 66, a memory card 67, a communication I/F 68, a power-supply circuit 69, a battery 69B, a mirror driving controller 72A, a shutter driving controller 73A, and an aperture driving controller 76A.

The image-capturing element 101 is formed of a CMOS color-area sensor, as described earlier. A timing control circuit 51 (to be described later) controls image-capturing operations, such as the start (and the completion) of the exposure operation of the image-capturing element 101, selection of the output of each pixel provided in the image-capturing element 101, and the reading of a pixel signal.

The AFE 5 has functions of supplying, to the image-capturing element 101, a timing pulse at which a predetermined operation is performed, performing predetermined signal processing on an image signal output from the image-capturing element 101 so that the image signal is converted into a digital signal, and outputting the digital signal to the image processor 61. The AFE 5 is configured to have a timing control circuit 51, a signal processor 52, an A/D converter 53, and the like.

The timing control circuit 51 generates predetermined timing pulses (pulses for generating a vertical scanning pulse φVn, a horizontal scanning pulse φVm, a reset signal φVr, and the like) on the basis of a reference clock output from the central controller 62, and outputs the timing signal to the image-capturing element 101, thereby controlling the image-capturing operation of the image-capturing element 101. By outputting predetermined timing pulses to the signal processor 52 and the A/D converter 53, respectively, the operations of the signal processor 52 and the A/D converter 53 are controlled.

The signal processor 52 performs predetermined analog signal processing on an analog image signal output from the image-capturing element 101. The signal processor 52 includes a correlated double sampling (CDS) circuit, an automatic gain control (AGC) circuit, a clamp circuit, and the like. On the basis of a timing pulse output from the timing control circuit 51, the A/D converter 53 converts analog image signals of R, G, and B, which are output from the signal processor 52, into digital image signals made up of a plurality of bits (for example, 12 bits).

The image processor 61 creates an image file by performing predetermined signal processing on image data output from the AFE 5. The image processor 61 is configured to have a black-level correction circuit 611, a white-balance control circuit 612, a gamma correction circuit 613, and the like. The image data received by the image processor 61 is once written in an image memory 614 in synchronization with the reading of the image-capturing element 101. Hereinafter, access is made to the image data written in the image memory 614, and processing is performed in each block of the image processor 61.

The black-level correction circuit 611 corrects the black level of each digital image signal of R, G, and B, which is A/D-converted by the A/D converter 53, into a reference black level.

On the basis of the reference for white in accordance with the light source, the white-balance control circuit 612 performs level conversion (white-balance (WB) adjustment) of a digital signal of components of each color of R (red), G (green), and B (blue). More specifically, on the basis of the WB adjustment data supplied from the central controller 62, the white-balance control circuit 612 specifies, from luminance data, color saturation data, and the like, a portion that is estimated to be originally white color in an image-capturing object, determines the average of the components of each of R, G, and B of that portion, a G/R ratio, and a G/B ratio, and performs level correction by using these ratios as correction gains of R and B.

The gamma correction circuit 613 corrects gradation characteristics of WB-adjusted image data. More specifically, by using a preset gamma correction table, the gamma correction circuit 613 performs, for each color component, non-linear conversion of the level of the image data, and offset adjustment.

The image memory 614 is a memory used as a work area in which, during the image-capturing mode, image data output from the image processor 61 is temporarily stored and also, a predetermined process is performed on the image data by the central controller 62. Furthermore, during the reproduction mode, image data read from the memory card 67 is temporarily stored.

The central controller 62 is configured as a microcomputer, which mainly includes a CPU, a memory, a ROM, and the like. The central controller 62 reads programs stored in the ROM and causes the CPU to execute the programs, thereby implementing various kinds of functions of the image-capturing apparatus 1A.

As a result of the execution of the programs, the central controller 62 realizes a display controller 62A, a phase-difference AF controller 62B, and a contrast AF controller 62C in a functional manner.

The display controller 62A controls display content on the LCD 311. For example, the display controller 62A causes each of a plurality of images that are continuously obtained by the image-capturing element 101 to be sequentially displayed as a live-view image on the LCD 311.

Furthermore, the display controller 62A has an AF area display function of combining, with a live-view image, an area (also referred to as an "AF area", a "focus detection area", or a "focus area") Ef (see FIG. 6) capable of obtaining focus information (capable of detecting focus) in the image-capturing plane so that they are displayed in a superposed manner.

Whether or not the AF area Ef should be displayed in a superposed manner in the live-view image differs according to whether or not the AF area display mode has been enabled by a user operation, such as a menu operation. That is, in a case where the AF area display mode has been enabled, a superposed display of the AF area Ef on the live-view image is performed, and in a case where the AF area display mode has not been enabled (disabled), a superposed display of the AF area Ef is not performed. Furthermore, it is possible for the user to select a display pattern of the AF area Ef. In a case where the AF area display mode has been enabled, a superposed display of the AF area Ef is performed in the selected display pattern, the details of which will be described later.

The phase-difference AF controller 62B performs focus position detection (focus detection) by using a phase-difference detection method, thereby performing an automatic focusing operation. More specifically, on the basis of a phase-difference detection signal obtained by the AF module 107 or an output signal from a phase-difference AF computation circuit 77 (to be described later), the phase-difference AF controller 62B performs a focus lens position specifying operation that specifies the position (focus lens position) of an image-capturing lens (in more detail, a focus lens) during in-focus.

The contrast AF controller 62C performs an automatic focusing operation (also referred to as a "contrast AF operation") by performing focus position detection by using a contrast detection method. More specifically, the contrast AF controller 62C performs an evaluation value computation operation for determining an evaluation value in accordance with the contrast of the object images with regard to a plurality of captured images obtained at different lens positions, respectively, and a focus lens position specifying operation for specifying a lens position at which the evaluation value is optimized (e.g., minimized) as a focus lens position.

The flash circuit 63 controls the amount of light emission of the flash unit 318 or an external flash connected to the connection terminal unit 319 so as to be set to the amount of light emission set by the central controller 62.

The operation unit 64 includes the mode setting dial 305, the control value setting dial 306, the shutter button 307, the setting button group 312, the direction selection key 314, the push button 315, the main switch 317, etc., and is used to input operation information to the central controller 62.

The VRAM 65 is a buffer memory between the central controller 62 and the LCD 311, which has a storage capacity of image signals corresponding to the number of pixels of the LCD 311. The card I/F 66 is an interface for enabling transmission and reception of signals between the memory card 67 and the central controller 62. The memory card 67 is a recording medium for storing image data generated by the central controller 62. The communication I/F 68 is an interface for enabling transmission of image data and the like to a personal computer or another external device.

The power-supply circuit 69 is formed of, for example, a constant voltage circuit and the like, and generates a voltage for driving the entire image-capturing apparatus 1A, such as the controller (such as the central controller 62), the image-capturing element 101, and other various kinds of driving units. Control of electricity supply to the image-capturing element 101 is performed in accordance with a control signal supplied from the central controller 62 to the power-supply circuit 69. The battery 69B is a power supply that is formed of a primary battery such as an alkali dry battery or a secondary battery such as a nickel-metal-hydride rechargeable battery, and that supplies electric power to the entire image-capturing apparatus 1A.

The mirror driving controller 72A generates a driving signal for driving the mirror driving actuator 72M in accordance with the switching of the finder mode or the timing of the image capturing operation. The mirror driving actuator 72M is an actuator that causes the mirror unit 103 (quick return mirror) to be rotated in a horizontal posture or in an inclined posture.

The shutter driving controller 73A generates a driving control signal for the shutter driving actuator 73M on the basis of the control signal supplied from the central controller 62. The shutter driving actuator 73M is an actuator for driving the opening/closing of the shutter unit 40.

The aperture driving controller 76A generates a driving control signal for the aperture driving actuator 76M on the basis of the control signal supplied from the central controller 62. The aperture driving actuator 76M supplies a driving force to the aperture drive mechanism 27 via the coupler 75.

The camera body 10 includes a phase-difference AF computation circuit 77 for performing computations necessary at auto-focus (AF) control time on the basis of image data whose black level has been corrected, which is output from the black-level correction circuit 611.

In the following, a phase-difference AF operation using an output signal from the phase-difference AF computation circuit 77 will be described in detail and also, an AF operation that can be performed by the image-capturing apparatus 1A will be described.

AF Operation of Image-Capturing Apparatus 1A

Figure 6:
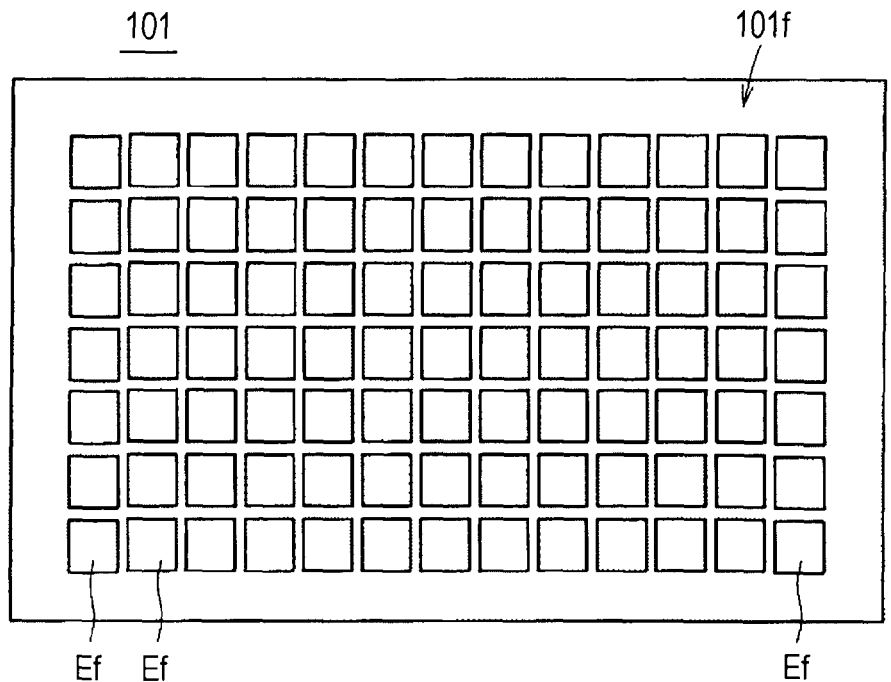
FIG. 6 illustrates the configuration of an image-capturing element.
Figure 7:
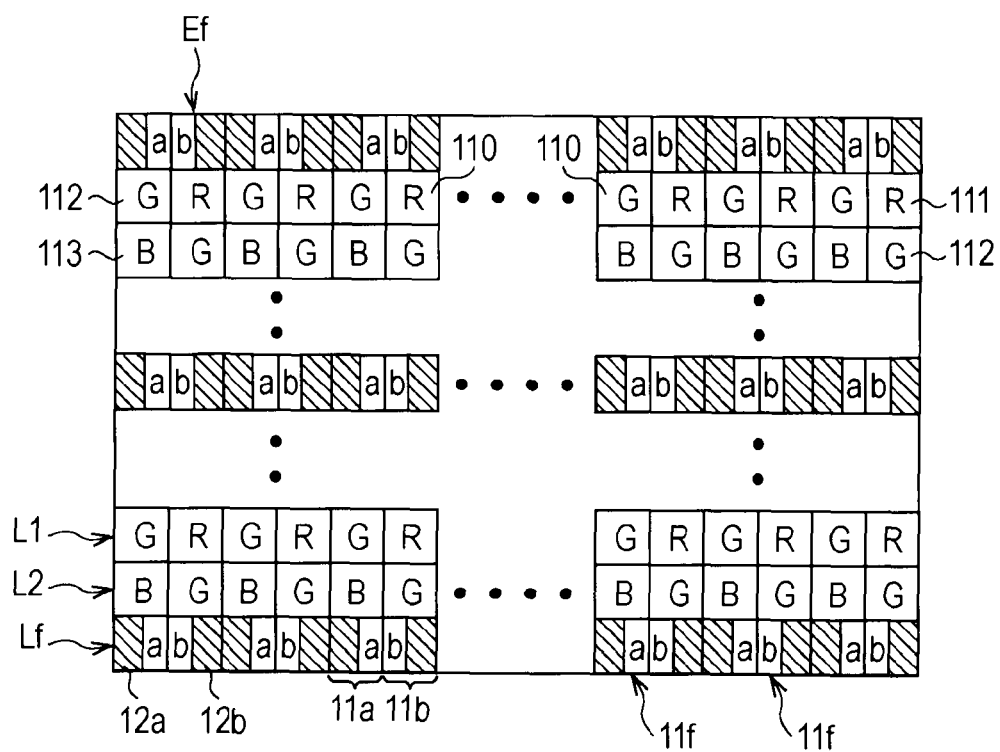
FIG. 7 illustrates the configuration of the image-capturing element.

The image-capturing apparatus 1A is configured in such a manner that phase-difference AF is possible by receiving transmitted light that is transmitted through (passed through) different portions within the exit pupil of the image-capturing lens by the image-capturing element 101. In the following, first, the configuration of the image-capturing element 101 and the principles of phase-difference AF using the image-capturing element 101 will be described. FIGS. 6 and 7 illustrate the configuration of the image-capturing element 101.

The image-capturing element 101 is configured in such a manner that focus detection of a phase-difference detection method is possible for each AF area Ef defined in matrix in an image-capturing plane 101f thereof (FIG. 6).

In each AF area Ef, ordinary pixels 110 formed of an R pixel 111, a G pixel 112, and a B pixel 113 in which color filters of each of R (red), G (green), and B (blue) are disposed in a photodiode are provided and also, a pixel (hereinafter also referred to as an "AF pixel" 11f having light-shielding plates 12a and 12b (parallel oblique line portion) (to be described later) for performing phase-difference AF are provided (FIG. 7). A set of ordinary pixels is also represented as an ordinary pixel group (also referred to as an "image obtaining pixel group"), and a set of AF pixels for detecting a phase difference is also represented as an AF pixel group.

Then, in the AF area Ef, a Gr line L1 in which a G pixel 112 and an R pixel 111 are alternately arranged in the horizontal direction as a horizontal line of ordinary pixels, and a Gb line L2 in which a B pixel 113 and a G pixel 112 are alternately arranged in the horizontal direction, are formed. As a result of the Gr line L1 and the Gb line L2 being alternately arranged in the vertical direction, Bayer arrangement is formed.

Furthermore, in the AF area Ef, for example, an AF line Lf in which AF pixels 11f are arranged in the horizontal direction every six horizontal lines of the ordinary pixels is formed. In the AF area Ef, for example, approximately 20 AF lines Lf are provided.

Next, the principles of phase-difference AF using an AF line Lf will be described in detail.

Figure 8:
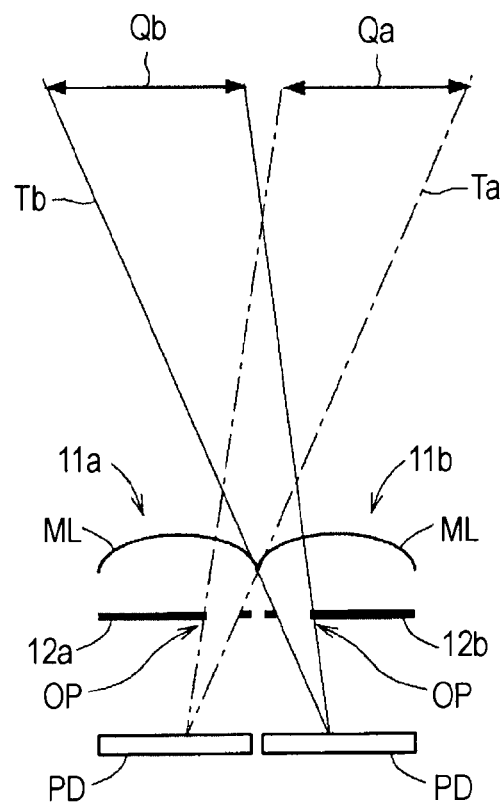
FIG. 8 illustrates the principles of phase-difference AF using an AF line.

FIG. 8 illustrates the principles of phase-difference AF using an AF line Lf.

In the AF line Lf, a pair of pixels 11a and 11b having light-shielding plates 12a and 12b, in which the positions of openings OP for separating a light flux Ta from the right-side portion Qa of the exit pupil and a light flux Tb from the left-side portion Qb thereof with regard to the interchangeable lens 2 are in mirror symmetry, are arranged in the horizontal direction. In more detail, a pixel (in the following, also referred to as a "first AF pixel") 11a having the light-shielding plate 12a in which an opening OP in a slit shape is offset to the right of a photoelectric converter (photodiode) PD just below, and a second light-shielding plate (in the following, also referred to as a "second AF pixel") 11b having the light-shielding plate 12b in which an opening OP in a slit shape is offset to the left of a photoelectric converter (photodiode) PD just below are alternately arranged in the AF line Lf (FIG. 7).

As a result, the light flux Ta from the right side portion Qa of the exit pupil passes through the microlens ML and the opening OP of the light-shielding plate 12a and is received by the photoelectric converter PD of the first AF pixel 11a. The light flux Tb from the left-side portion Qb of the exit pupil passes through the microlens ML and the opening OP of the light-shielding plate 12b and is received by the photoelectric converter PD of the second AF pixel 11b. In other words, in the pair of pixels 11a and 11b, the light fluxes Ta and Tb of the object light that has been transmitted through the right-side portion and the left-side portion (pair of partial areas) Qa and Qb in the exit pupil of the interchangeable lens 2 are received, respectively.

Figure 9:
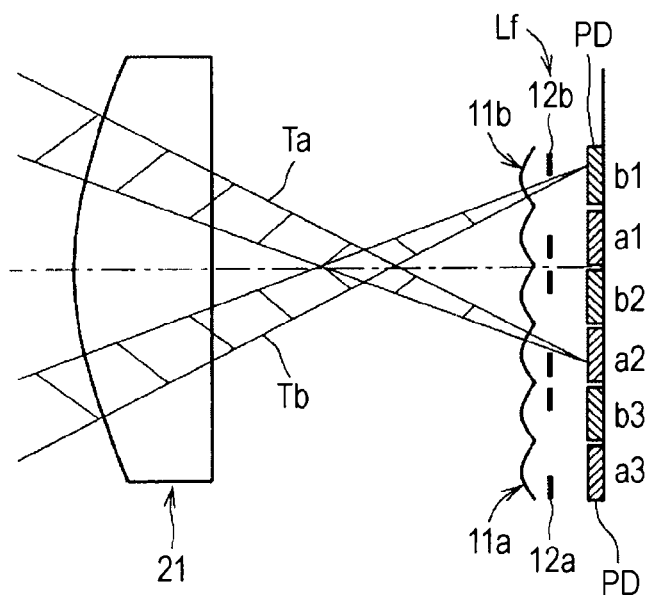
FIG. 9 shows the relationship between light fluxes that enter from an the exit pupil of an image-capturing lens and AF pixels of an image-capturing element.
Figure 10:
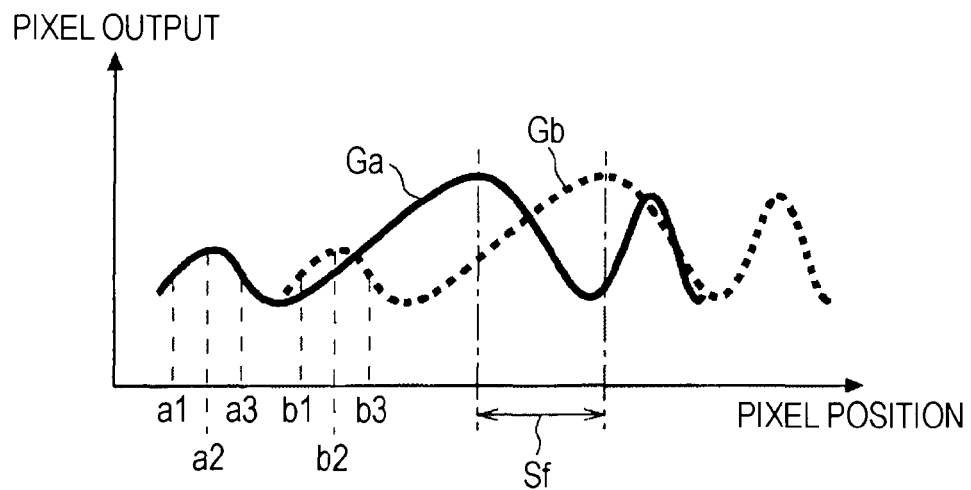
FIG. 10 shows pixel output of an AF line.
Figure 11:
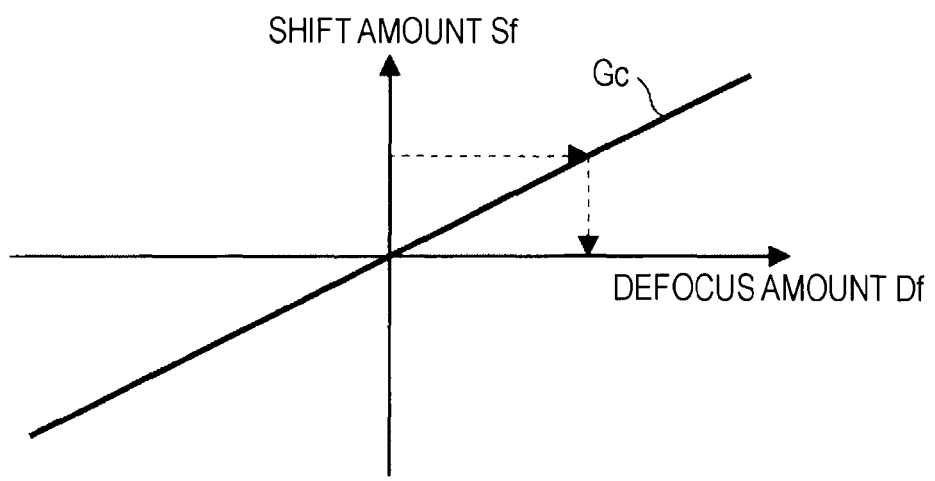
FIG. 11 shows the relationship between the shift amount and the defocus amount of pixel output.

In the following, the pixel output of the first AF pixel 11a will be referred to as "pixel output of sequence a", and the pixel output of the second AF pixel 11b will be referred to as "pixel output of sequence b". A description will be given below, with reference to FIGS. 9 and 10, of the relationship between, for example, the pixel output of sequence a and the pixel output of sequence b, which are obtained from the pixel arrangement of the AF pixels 11f arranged in one certain AF line Lf. FIG. 9 shows the relationship between light fluxes that enter from the exit pupil of an image-capturing lens and the AF pixels 11f of the image-capturing element 101. FIG. 10 shows the pixel output of an AF line Lf. FIG. 11 shows the shift amount Sf and the defocus amount Df of pixel output.

In the AF line Lf, as shown in, for example, FIG. 9, the light fluxes Ta and Tb from both sides of the exit pupil are received by the first AF pixel 11a and the second AF pixel 11b, respectively. Here, the pixel output of sequence a in the AF line Lf including pixels a1 to a3 of sequence a arranged as shown in FIG. 9 is expressed as a graph Ga (shown using the solid line) in FIG. 10. On the other hand, the pixel output of sequence b in the AF line Lf including pixels b1 to b3 of sequence b arranged as shown in FIG. 9 is expressed as a graph Gb (shown using the dashed line) in FIG. 10.

When the graph Ga and the graph Gb shown in FIG. 10 are compared with each other, it can be seen that, for the pixel output of sequence a and the pixel output of sequence b, a phase difference has occurred in an offset amount (shift amount) Sf in the direction of the AF line Lf.

On the other hand, the relationship between the above-described shift amount Sf and the amount (the defocus amount) Df that the focal plane is defocused to the image-capturing plane of the image-capturing element 101 is represented by a graph Gc of a primary function shown in FIG. 11. The inclination of the graph Gc can be obtained in advance by a factory test and the like.

Therefore, after the shift amount Sf is determined by the phase-difference AF computation circuit 77 on the basis of the output from the AF line Lf of the image-capturing element 101, the phase-difference AF controller 62B computes the defocus amount Df on the basis of the graph Gc of FIG. 11 and supplies the driving amount corresponding to the computed defocus amount Df to the focus lens 211, making possible phase-difference AF that causes the focus lens 211 to be moved to the focus position.

As described above, it is possible for the image-capturing apparatus 1A to perform an automatic focusing operation (also referred to as a "phase-difference AF operation" by the image-capturing element 101) of a phase-difference detection method using an output signal from the light-receiving element incorporated on the light-receiving surface of the image-capturing element 101.

Furthermore, the image-capturing apparatus 1A has functions of performing a phase-difference AF operation and a contrast AF operation by the AF module 107 in addition to the phase-difference AF operation by the image-capturing element 101. Whether or not each of these AF operations can be performed differs according to the finder mode.

More specifically, in the OVF mode, a mirror-down state (FIG. 3) is reached, and some of the object light is guided to the AF module 107. As a consequence, as an AF operation, an AF operation of a phase-difference detection method (also referred to as a "phase-difference AF operation" by the "AF module 107") using an output signal from the light-receiving element inside the AF module 107 is made possible.

On the other hand, in the EVF mode, a mirror-up state (FIG. 4) is reached, and the object light is guided to the image-capturing element 101. As a consequence, as an AF operation, a phase-difference AF operation and/or a contrast AF operation by the image-capturing element 101 are made possible. As an AF operation in the EVF mode, which one of the AF operations (a phase-difference AF operation and a contrast AF operation by the image-capturing element 101) using the image-capturing element 101 should be performed can be determined by performing a menu operation on the menu screen.

AF Area Display During EVF Mode

Figure 12:
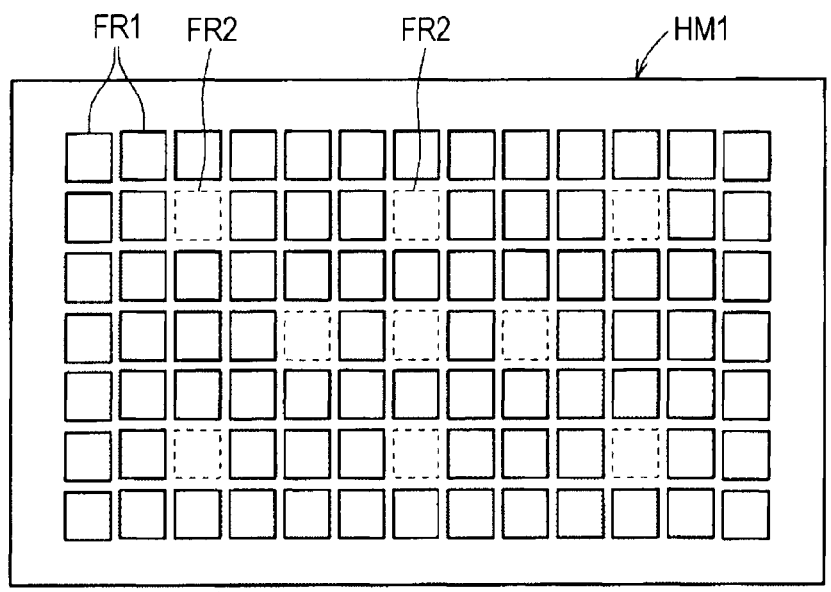
FIG. 12 shows an exemplary display of AF areas on an LCD.
Figure 13:
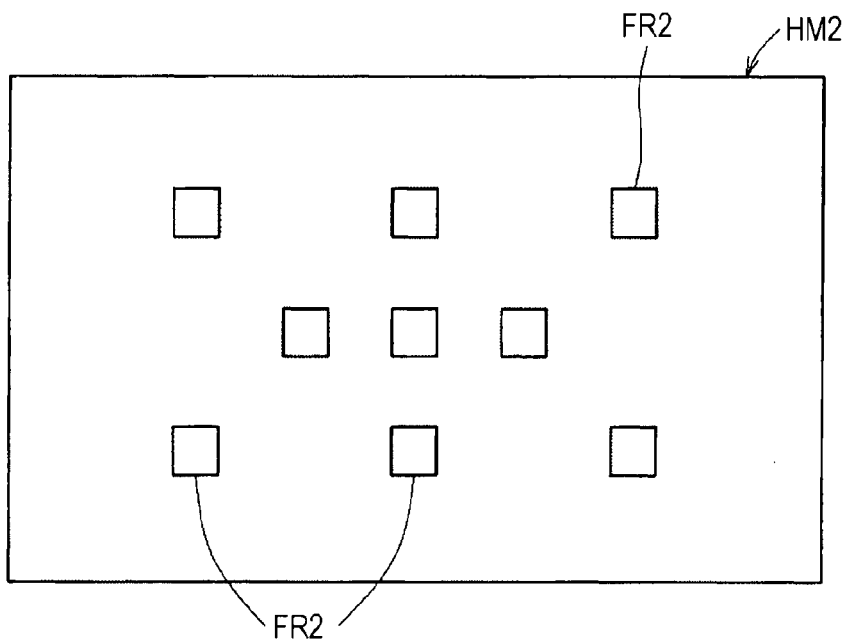
FIG. 13 shows an exemplary display of AF areas on an LCD.
Figure 14:
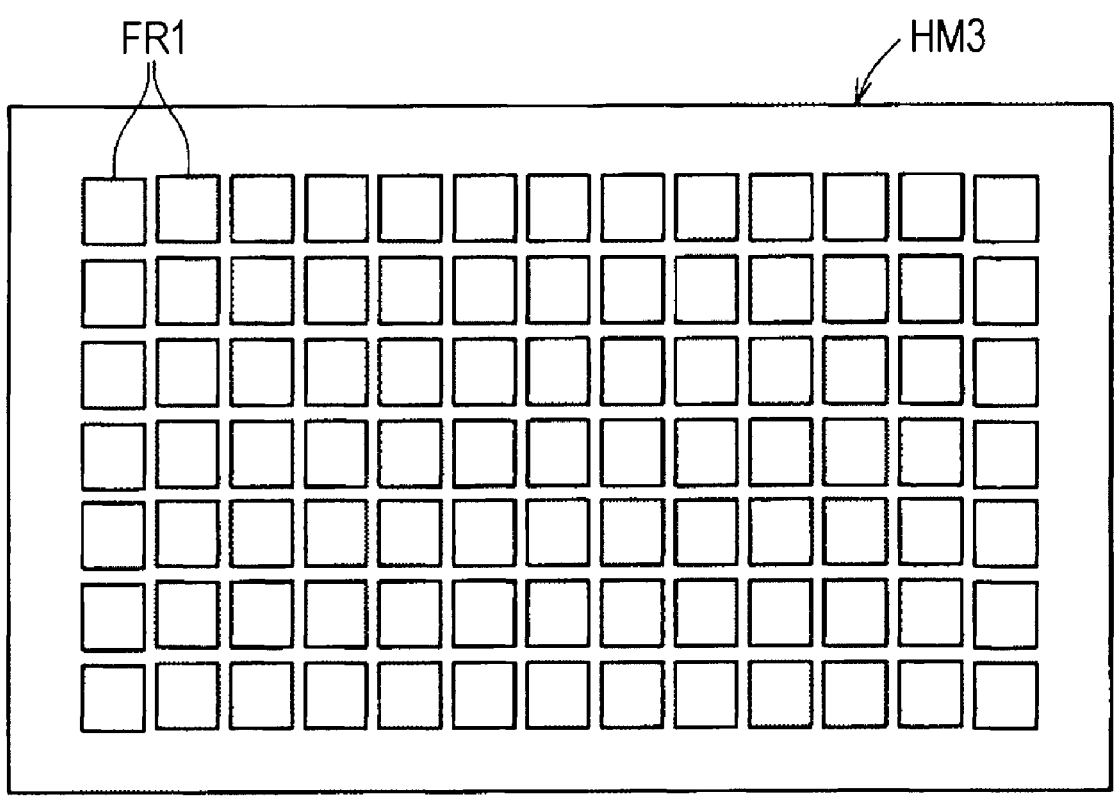
FIG. 14 shows an exemplary display of AF areas on an LCD.

Here, a display of the AF area Ef in the live-view image, which is performed by the display controller 62A, will be described in detail. FIGS. 12, 13 and 14 show examples of displays of an AF area on the LCD 311.

In the manner described above, in the EVF mode, a live-view image is displayed on the LCD 311, and framing is performed while visually recognizing the live-view display. Then, in a case where the AF area display mode has been enabled, the AF area Ef is displayed on the live-view image in a superposed manner.

Examples of the AF area Ef to be displayed include an AF area (also referred to as an "image AF area") FR1 (a rectangular area drawn using the solid line in FIG. 12) used for an AF operation using the image-capturing element 101, and an AF area (also referred to as a "module AF area") FR2 (a rectangular area drawn using the dashed line in FIG. 12) used for a phase-difference AF operation by the AF module 107. These AF areas Ef are selectively or simultaneously displayed.

More specifically, the display pattern of the AF area Ef can be changed by a menu operation or the like, and the image-capturing apparatus 1A has, for example, three display patterns. In more detail, the image-capturing apparatus 1A has a display pattern HM1 (see FIG. 12) with which the image AF area FR1 and the module AF area FR2 are simultaneously displayed on the LCD 311, a display pattern HM2 (see FIG. 13) with which the image AF area FR1 is set not to be displayed and the module AF area FR2 is displayed on the LCD 311, and a display pattern HM3 (see FIG. 14) with which the module AF area FR2 is set not to be displayed and the image AF area FR1 is displayed on the LCD 311. It is possible for the user to select one of the display patterns.

The image AF area FR1 in FIG. 12 shows an AF area used for a phase-difference AF operation by the image-capturing element 101. Furthermore, in FIG. 12, the module AF area FR2 is displayed in the image AF area FR1. An area displayed in such a manner as to be recognized as the module AF area FR2 also functions as the image AF area FR1. That is, an area displayed as the module AF area FR2 in FIG. 12 is also used for an AF operation using the image-capturing element 101.

In a case where, as the display pattern of the AF area Ef, a module AF area display pattern (a display pattern HM1 or a display pattern HM2) has been selected with which the module AF area FR2 is displayed on the LCD 311, it is possible for the user to visually recognize the module AF area FR2 at the time of framing in the EVF mode. In a case where the user plans to change the mode from the EVF mode to the OVF mode after framing in the EVF mode is completed, by selecting a module AF area display pattern, framing can be performed so that the object is positioned in advance in the module AF area FR2 in the EVF mode before the mode is changed. Therefore, it is possible to avoid repeated angle of view adjustment after the mode is changed.

In a case where the change of the mode from the EVF mode to the OVF mode is not planed, by selecting the display pattern HM3 with which the image AF area FR1 is displayed, it is possible for the user to perform angle of view adjustment by considering the AF area. Therefore, it becomes easier to obtain an image in which focusing of the object is achieved.

In a case where the display of the AF area Ef in the live-view image is annoying, it is possible for the user to cause the AF area Ef to not be displayed by disabling the AF area display mode. According to this, the ease of viewing of the live-view image is improved.

As described above, in the image-capturing apparatus 1A, it is possible for the user to select a technique of displaying an AF area Ef in accordance with the user's preference. Therefore, it is possible for the user to visually recognize a live-view image in accordance with the user's preference.

Basic Operation of Image-Capturing Apparatus 1A

Figure 15:
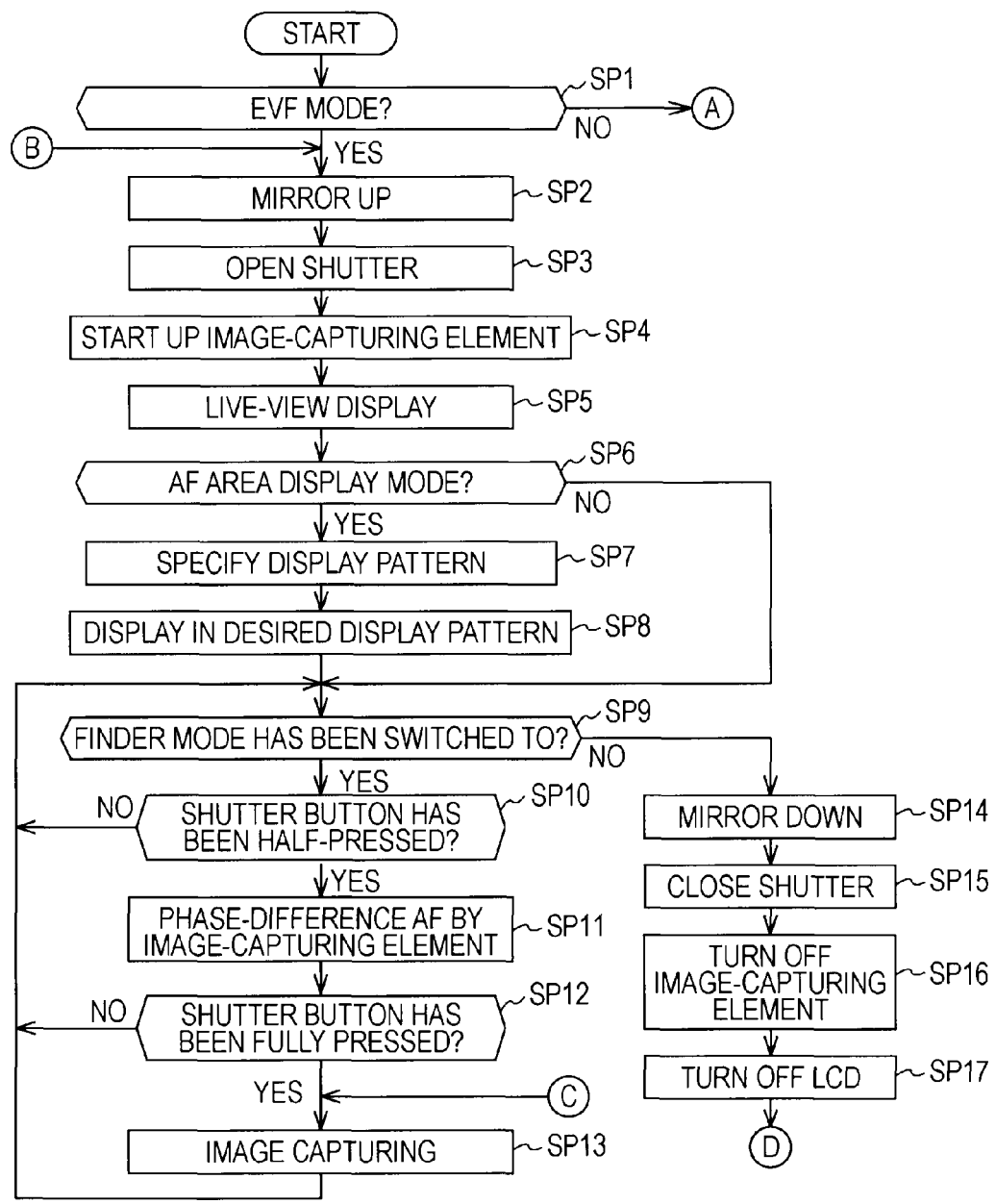
FIG. 15 is a flowchart of the image-capturing operation of an image-capturing apparatus.
Figure 16:
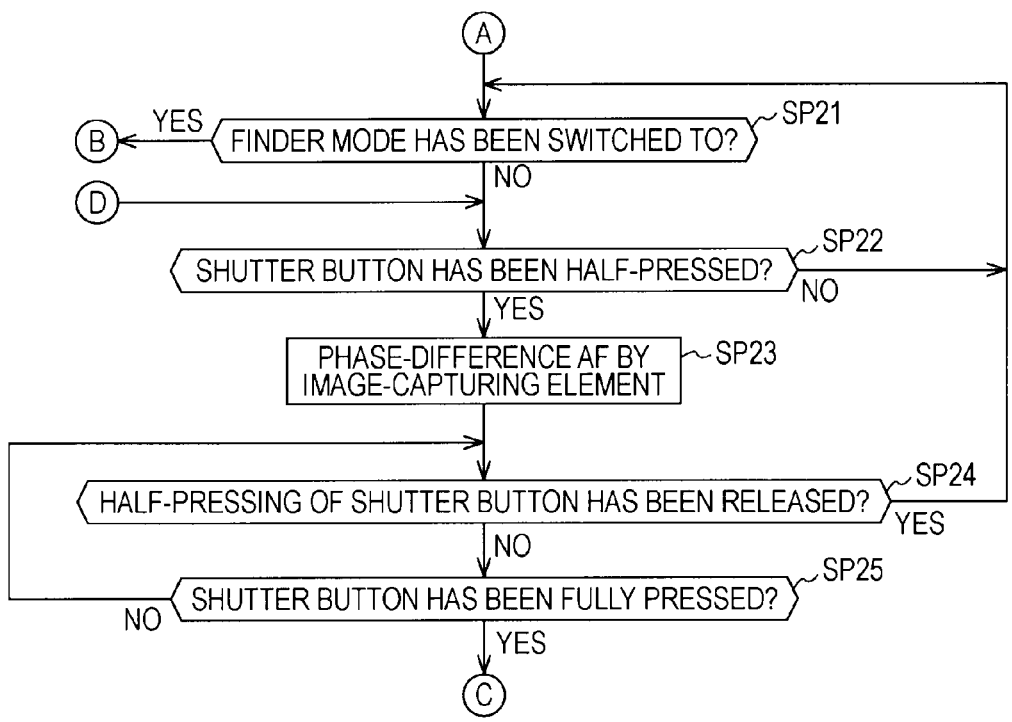
FIG. 16 is a flowchart of an image-capturing operation of the image-capturing apparatus.

Next, the basic operation of the image-capturing apparatus 1A will be described. FIGS. 15 and 16 are flowcharts of image-capturing operations of the image-capturing apparatus 1A.

When the image-capturing mode is selected by a dial operation using the mode setting dial 305 of the image-capturing apparatus 1A, image-capturing operations shown in FIGS. 15 and 16 are performed.

More specifically, as shown in FIG. 15, initially, in step SP1, it is determined whether or not the EVF mode has been selected by the operation of the display selector switch 85. When it is determined that the EVF mode has not been selected, the process proceeds to step SP21 (FIG. 16), where a composition determination operation in the OVF mode is made possible. Each of step SP21 and subsequent steps will be described later.

On the other hand, when it is determined that the EVF mode has been selected, the process proceeds to step SP2, where a composition determination operation in the EVF mode is made possible.

More specifically, in step SP2, the mirror unit 103 is driven, and the mirror unit 103 becomes retracted from the light path of the object light passing through the interchangeable lens 2.

In step SP3, the shutter unit 40 is closed. In step SP4, the image-capturing element 101 is started up so as to be able to generate an image signal as a result of exposure.

In step SP5, the supply of electricity to the LCD 311 is started, and on the basis of the image signals that are sequentially generated in the image-capturing element 101, the display controller 62A allows the display of the live-view image to be started on the LCD 311.

In step SP6, it is determined whether or not the AF area display mode has been enabled. In a case where the AF area display mode has been enabled, the process proceeds to step SP7, where a superposed display of the AF area Ef in the live-view image is started. On the other hand, in a case where the AF area display mode has not been enabled, a superposed display of the AF area Ef in the live-view image is not performed, and the process proceeds to step SP9.

In step SP7, the display pattern of the AF area Ef that has been currently set by the user is specified.

Then, in step SP8, a superposed display of the AF area Ef in the live-view image is performed in a desired display pattern that has been set by the user. For example, in a case where the display pattern HM2 has been selected, as shown in FIG. 13, the module AF area FR2 is combined with the live-view image and displayed.

In the subsequent step SP9, it is determined whether or not the finder mode has been switched to. More specifically, when the contact position of a display selector switch 85 is detected and the display selector switch 85 has been set to the OVF mode (when the contact position is at an "optical"), the process proceeds to step SP14, where the mode is changed (shifted) from the EVF mode to the OVF mode, the details of which will be described later.

On the other hand, when the display selector switch 85 has been set to the EVF mode (when the contact position is at a "monitor"), the process proceeds to step SP10.

In step SP10, it is determined whether or not the shutter button 307 has been half pressed. When the half pressing is not detected, the process proceeds to step SP9, where the processing of step SP9 is performed again. When the half pressing is detected, the process proceeds to step SP11.

In step SP11, a phase-difference AF operation by the image-capturing element 101 is performed.

In step SP12, it is determined whether or not the shutter button 307 has been fully pressed. When the full pressing is not detected, the process proceeds to step SP9, where the processing of step SP9 is performed again. When the full pressing is detected, the process proceeds to step SP13.

In step SP13, image capturing (exposure) is performed. More specifically, in a mirror-up state in which object light enters the image-capturing element 101, exposure by the image-capturing element 101 is started. Then, predetermined image processing is performed on an image signal obtained by the image-capturing element 101, and the image signal is recorded in a memory card 67 or the like.

When step SP13 is completed, the process proceeds to step SP9, where the processing of step SP9 is performed again.

Next, a description will be given of processing in a case where it is determined in step SP9 that the display selector switch 85 has been set to the OVF mode.

In this case, the process proceeds to step SP14, where the finder mode shifts (mode shift) to the OVF mode.

More specifically, in step SP14, the mirror unit 103 is driven, and the mirror unit 103 enters a mirror-down state in which it is arranged in the light path of the object light.

In the subsequent step SP15, the shutter unit 40 is closed, and in step SP16, the image-capturing element 101 is stopped. Then, in step SP17, the LCD 311 is turned off, and the process proceeds to step SP22 (FIG. 16).

After proceeding to step SP22, when the shutter button 307 has not been operated and the shift to the finder mode is detected (step SP21), the process proceeds to step SP2, where the mode shifts from the OVF mode to the EVF mode (to be described later).

As described above, in the EVF mode, a live-view display on the LCD 311 is performed on the basis of image signals that are sequentially generated by the image-capturing element 101 and also, the AF area Ef is displayed on the LCD 311. As the AF area Ef to be displayed, in addition to the image AF area FR1 used for an AF operation using the image-capturing element 101, the module AF area FR2 used for a phase-difference AF operation by the AF module 107 is displayed.

Next, a description will be given of a case in which it is determined in step SP1 that the EVF mode has not been selected by the operation of the display selector switch 85 (the OVF mode has been selected), and the process proceeds to step SP21 (FIG. 16).

In this case, initially, in step SP21, the contact position of the display selector switch 85 is detected similarly to step SP9 described above, and it is determined whether or not the finder mode has been switched to. When the contact position has been set to the OVF mode (when the contact position is at an "optical"), by assuming that the finder mode has not been switched to, the process proceeds to step SP22. When the contact position has been set to the EVF mode (when the contact position is at a "monitor"), the process proceeds to step SP2.

In the subsequent step SP22, similarly to step SP10 described above, it is detected whether or not the shutter button 307 has been half pressed. When the half pressing is not detected, the process proceeds to step SP21, where the processing of step SP21 is performed again. On the other hand, when the half pressing is detected, the process proceeds to step SP23.

In step SP23, a phase-difference AF operation by the AF module 107 is performed.

In the subsequent step SP24, it is determined whether or not the half pressing of the shutter button 307 has been released. When the release of the half pressing is detected, the process proceeds to step SP21, where the processing of step SP21 is performed again. On the other hand, when the release of the half-pressed state is not detected, the process proceeds to step SP25.

In step SP25, similarly to step SP12 described above, it is detected whether or not the shutter button 307 has been fully pressed. When the full pressing of the shutter button 307 is not detected, the process proceeds to step SP24, where the processing of step SP24 is performed again. On the other hand, when the full pressing of the shutter button 307 is detected, the process proceeds to step SP13 described above, where image capturing is performed.

As described above, in the image-capturing apparatus 1A, it is possible for the user to change the technique of displaying the AF area Ef to be displayed at the time of a live-view display in accordance with the preference. Therefore, it is possible to improve convenience regarding focusing. As a result, the image-capturing apparatus 1 becomes a camera having ease of use for the user.

Second Embodiment

Next, a second embodiment of the present invention will be described. In the image-capturing apparatus 1A according to the first embodiment, when the AF area display mode is enabled, an AF area Ef is superposed on a live-view image and displayed. In an image-capturing apparatus 1B according to the second embodiment, non-display setting of an AF area Ef and setting of a display pattern of an AF area Ef are selectively performed by an identical operation.

The image-capturing apparatus 1B according to the second embodiment has a configuration and functions (see FIGS. 1 to 9) that are almost identical to those of the image-capturing apparatus 1A according to the first embodiment. The common components are designated with the same reference numerals, and the descriptions thereof are omitted.

Figure 17:
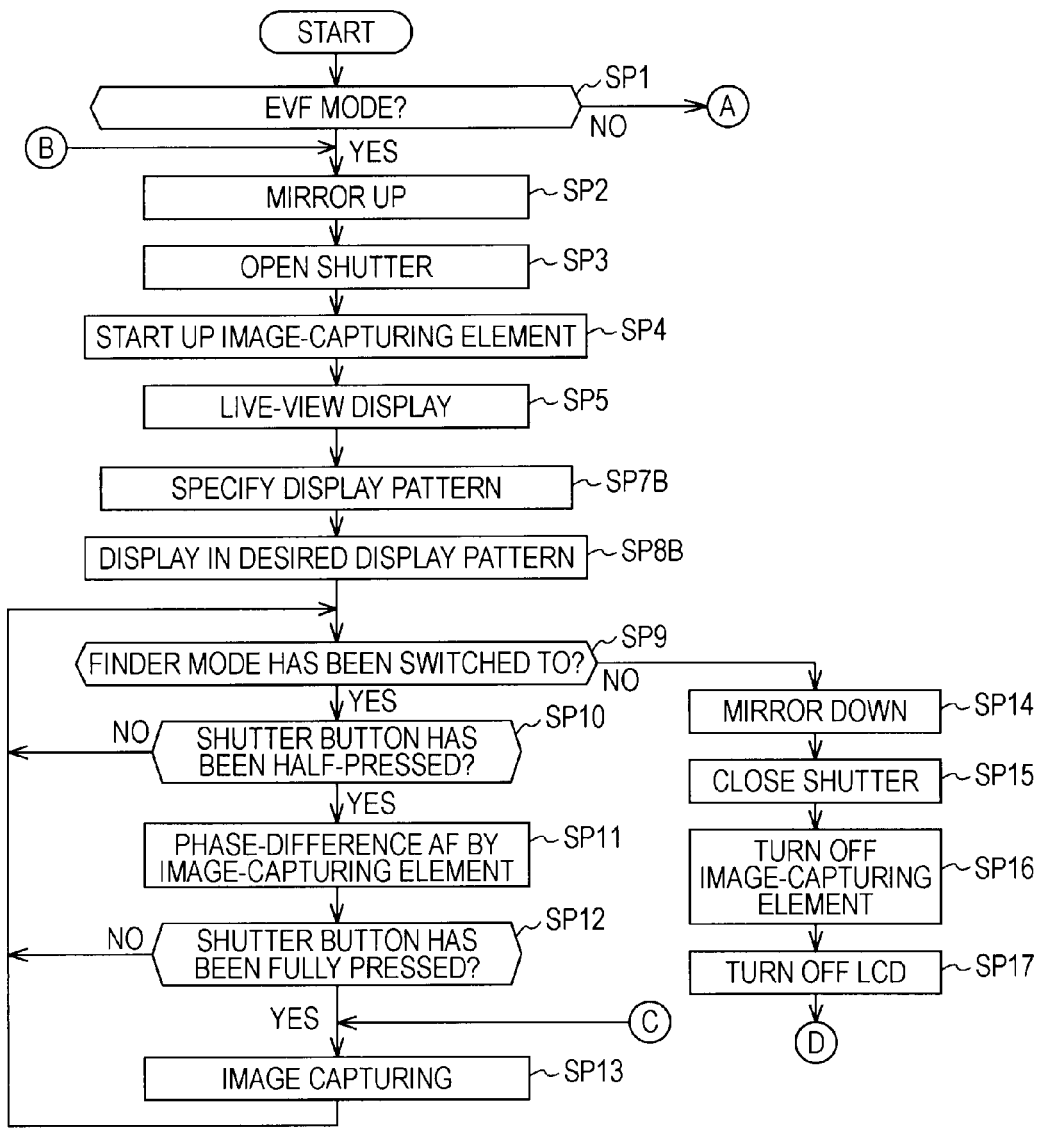
FIG. 17 is a flowchart of the image-capturing operation of an image-capturing apparatus according to a second embodiment of the present invention.

In the manner described above, the display controller 62A of the image-capturing apparatus 1B has a function of selectively selecting the non-display setting of the AF area Ef and the setting of the display pattern of the AF area Ef and changing (switching) (a function of changing the display pattern of the AF area (display pattern switching function)) the display pattern in accordance with the operation of the user (in detail, a menu operation or an operation using an operation member, such as a button provided in the image-capturing apparatus 1B. FIG. 17 shows part of a flowchart of the image-capturing operation of the image-capturing apparatus 1B and corresponds to the flowchart of the first embodiment shown in FIG. 15. Operations in FIG. 17, which are common to those in FIG. 15, are designated with the same reference numerals, and descriptions thereof are omitted.

More specifically, in the image-capturing apparatus 1B, it is possible for the user to switch among the display pattern HM1 (see FIG. 12) with which the image AF area FR1 and the module AF area FR2 are displayed, the display pattern HM2 (see FIG. 13) with which the image AF area FR1 is set to not be displayed and the module AF area FR2 is displayed, the display pattern HM3 (see FIG. 14) with which the module AF area FR2 is set to not be displayed and the image AF area FR1 is displayed, and a display pattern (also referred to as a "non-display pattern") with which neither AF area Ef of the image AF area FR1 and the module AF area FR2 is displayed.

In more detail, in the image-capturing apparatus 1B, as shown in FIG. 17, the EVF mode is selected, and in step SP5, the display of the live-view image is started. Thereafter, the process proceeds to step SP7B.

In step SP7B, the display pattern of the AF area Ef that is currently set is identified.

Then, in step SP8B, a superposed display of the AF area Ef on the live-view image is performed using a desired display pattern that has been set by the user. For example, when the display pattern HM1 has been selected, as shown in FIG. 13, the image AF area FR1 and the module AF area FR2 are combined with the live-view image and displayed. Furthermore, when a non-display pattern has been selected, an AF area Ef is not displayed on the LCD 311, and a live-view image obtained by the image-capturing element 101 is displayed.

Modification

The embodiments of the present invention have been described above. However, the present invention is not limited to the above-described content.

Figure 18:
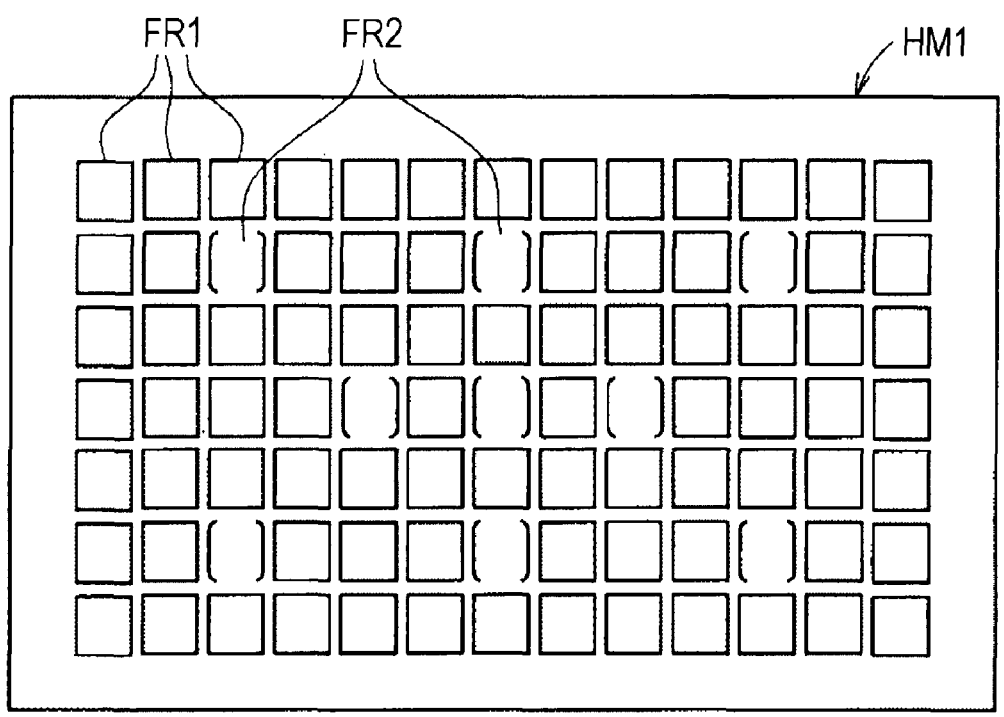
FIG. 18 shows an exemplary display of AF areas on an LCD.

For example, in each of the above-described embodiments, as shown in FIG. 12, the image AF area FR1 has been shown using the solid line, and the module AF area FR2 has been shown using the dashed line, but are not limited to these and may be shown using other forms. FIG. 18 shows an exemplary display of AF areas on an LCD.

More specifically, as shown in FIG. 18, the shape of a frame showing an AF area may differ between the image AF area FR1 and the module AF area FR2. Alternatively, frames may be displayed in a color-coded manner, such as a frame showing the image AF area FR1 being displayed in red color, and a frame showing the module AF area FR2 being displayed in blue.

It should be understood by those skilled in the art that various modifications, combinations, sub-combinations and alterations may occur depending on design requirements and other factors insofar as they are within the scope of the appended claims or the equivalents thereof.

What is claimed is:

1. An image-capturing apparatus comprising:
   an image-capturing element configured to receive object light and generate image signals representing an object image;
   a display unit;
   a phase-difference detector configured to receive the object light using a range-finding sensor and generate a phase-difference detection signal;
   first focus detection means for performing focus detection on the basis of the phase-difference detection signal;
   display control means for displaying a preview image before actual image capturing on the display unit on the basis of the image signals that are sequentially generated by the image-capturing element; and
   setting means for setting whether or not an area display mode in which an area in which focus detection is possible on an image-capturing plane is combined with the preview image and displayed on the display unit should be enabled,
   wherein, when the area display mode has been enabled, the display control means allows only a first area in which focus detection is performed using the range-finding sensor to be displayed on the display unit, and when the area display mode has not been enabled, the display control means does not allow the first area to be displayed on the display unit.

2. The image-capturing apparatus according to claim 1, further comprising:
    second focus detection means for performing focus detection on the basis of an output signal obtained from a second area defined in the image-capturing element,
    wherein, when the area display mode has been enabled, the display control means allows only the first area to be displayed on the display unit.

3. The image-capturing apparatus according to claim 2, further comprising:
    display pattern setting means for setting a display pattern of the area,
    wherein, when the area display mode has been enabled, the display control means allows only the first area to be displayed on the display unit on the basis of the display pattern set by the display pattern setting means.

4. The image-capturing element according to claim 2, wherein the output signal is the image signal generated by the image-capturing element.

5. The image-capturing apparatus according to claim 2, wherein the image-capturing element includes a group of first pixels for generating the image signal, and a group of second pixels for performing phase-difference detection, and
    wherein the output signal is a signal output from the group of second pixels.

6. An image-capturing apparatus comprising:
    an image-capturing element configured to receive object light and generate image signals representing an object image;
    a display unit;
    a mirror unit configured to, as a result of being arranged in a light path of the object light, change the light path of the object light;
    a phase-difference detector configured to receive the object light whose light path has been changed by the mirror unit using a range-finding sensor and generate a phase-difference detection signal;
    focus detection means for performing focus detection on the basis of the phase-difference detection signal;
    mirror control means for retracting the mirror unit from the light path;
    display control means for displaying a preview image before actual image capturing on the display unit on the basis of the image signals that are sequentially generated by the image-capturing element in a state in which the mirror unit has been retracted from the light path; and
    setting means for setting whether or not an area display mode in which an area in which focus detection is possible on an image-capturing plane is combined with the preview image and displayed on the display unit should be enabled,
    wherein, when the area display mode has been enabled, the display control means allows only the area in which focus detection is performed using the range-finding sensor to be displayed on the display unit at the time of display of the preview image, and when the area display mode has not been enabled, the display control means does not allow the area to be displayed on the display unit.

7. An image-capturing apparatus comprising:
    an image-capturing element configured to receive object light and generate image signals representing an object image;
    a display unit;
    a phase-difference detector configured to receive the object light using a range-finding sensor and generate a phase-difference detection signal;
    first focus detection means for performing focus detection on the basis of the phase-difference detection signal; and
    display control means for displaying a preview image before actual image capturing on the display unit on the basis of the image signals that are sequentially generated by the image-capturing element,
    wherein the display control means includes display pattern switching means for selectively switching between a first display pattern with which only a first focus detection area in which focus detection is performed using the range-finding sensor on an image-capturing plane is displayed on the display unit and a non-display pattern with which a focus detection area is not displayed on the display unit.

8. The image-capturing apparatus according to claim 7, further comprising:
    second focus detection means for performing focus detection on the basis of an output signal obtained from a second focus detection area defined in the image-capturing element,
    wherein the display pattern switching means selectively switches among the first display pattern, a second display pattern with which the second focus detection area is displayed on the display unit, a third display pattern with which the first focus detection area and the second focus detection area are displayed on the display unit, and the non-display pattern.

9. An image-capturing apparatus comprising:
    an image-capturing element configured to receive object light and generate image signals representing an object image;
    a display unit;
    a phase-difference detector configured to receive the object light using a range-finding sensor and generate a phase-difference detection signal;
    a first focus detection unit configured to perform focus detection on the basis of the phase-difference detection signal;
    a display control unit configured to display a preview image before actual image capturing on the display unit on the basis of the image signals that are sequentially generated by the image-capturing element; and
    a setting unit configured to set whether or not an area display mode in which an area in which focus detection is possible on an image-capturing plane is combined with the preview image and displayed on the display unit should be enabled,
    wherein, when the area display mode has been enabled, the display control unit allows only a first area in which focus detection is performed using the range-finding sensor to be displayed on the display unit, and when the area display mode has not been enabled, the display control unit does not allow the first area to be displayed on the display unit.

10. An image-capturing apparatus comprising:
    an image-capturing element configured to receive object light and generate image signals representing an object image;
    a display unit;
    a mirror unit configured to, as a result of being arranged in a light path of the object light, change the light path of the object light;

a phase-difference detector configured to receive the object light whose light path has been changed by the mirror unit using a range-finding sensor and generate a phase-difference detection signal;
a focus detection unit configured to performing focus detection on the basis of the phase-difference detection signal;
a mirror control unit configured to retract the mirror unit from the light path;
a display control unit configured to display a preview image before actual image capturing on the display unit on the basis of the image signals that are sequentially generated by the image-capturing element in a state in which the mirror unit has been retracted from the light path; and
a setting unit configured to set whether or not an area display mode in which an area in which focus detection is possible on an image-capturing plane is combined with the preview image and displayed on the display unit should be enabled,
wherein, when the area display mode has been enabled, the display control unit allows only the area in which focus detection is performed using the range-finding sensor to be displayed on the display unit when the preview image is to be displayed, and when the area display mode has not been enabled, the display control unit does not allow the first area to be displayed on the display unit.

11. An image-capturing apparatus comprising:
an image-capturing element configured to receive object light and generate image signals representing an object image;
a display unit;
a phase-difference detector configured to receive the object light using a range-finding sensor and generate a phase-difference detection signal;
a first focus detection unit configured to perform focus detection on the basis of the phase-difference detection signal; and
a display control unit configured to display a preview image before actual image capturing on the display unit on the basis of the image signals that are sequentially generated by the image-capturing element,
wherein the display control unit includes a display pattern switching unit configured to selectively switch between a first display pattern with which only a first focus detection area in which focus detection is performed using the range-finding sensor on an image-capturing plane is displayed on the display unit and a non-display pattern with which a focus detection area is not displayed on the display unit.

* * * * *